United States Patent
Gazeau et al.

(10) Patent No.: US 8,572,291 B2
(45) Date of Patent: Oct. 29, 2013

(54) ELECTRONIC BOARD AND SYSTEM COMPRISING A PLURALITY OF SUCH BOARDS

(75) Inventors: Jean-Pierre Gazeau, Chatellerault (FR); Frédéric Massias, Terce (FR); Saïd Zeghloul, Terce (FR)

(73) Assignee: University de Poitiers, Poitiers (FR)

( * ) Notice: Subject to any disclaimer, the term of this patent is extended or adjusted under 35 U.S.C. 154(b) by 154 days.

(21) Appl. No.: 12/996,265

(22) PCT Filed: May 29, 2009

(86) PCT No.: PCT/FR2009/000628
§ 371 (c)(1),
(2), (4) Date: Feb. 23, 2011

(87) PCT Pub. No.: WO2009/156611
PCT Pub. Date: Dec. 30, 2009

(65) Prior Publication Data
US 2011/0166702 A1    Jul. 7, 2011

(30) Foreign Application Priority Data
Jun. 3, 2008    (FR) ...................................... 08 03046

(51) Int. Cl.
*G06F 3/00*    (2006.01)
*G06F 13/00*    (2006.01)
(52) U.S. Cl.
USPC .................................. 710/5; 709/223; 700/19
(58) Field of Classification Search
USPC .............. 710/5–8, 300; 709/223–225; 700/19
See application file for complete search history.

(56) References Cited

U.S. PATENT DOCUMENTS

| 4,992,926 A | * | 2/1991 | Janke et al. | 709/225 |
| 5,432,791 A | * | 7/1995 | Gancarcik | 370/516 |

(Continued)

FOREIGN PATENT DOCUMENTS

| CN | 1897594 | 1/2007 |
| WO | 2005 124569 | 12/2005 |

OTHER PUBLICATIONS

"MVME2300 Series VME Processor Module" Programmer's Reference Guid, V2300A/PG5, Edition of Jun. 2001, Retrieved from the Internet: URL:http://www.sls.psi.ch/controls/hardware/pdf/v2300apg.pdf>, pp. 1-45 (Jun. 1, 2006) XP-002510624.

(Continued)

*Primary Examiner* — Christopher Shin
(74) *Attorney, Agent, or Firm* — Oblon, Spivak, McClelland, Maier & Neustadt, L.L.P.

(57) ABSTRACT

The invention relates to an electronic board (C) comprising: a microcontroller; a first interface means (11) with a communication bus (BUS); and a second interface means (12) with a supervisory computer (SUP); said microcontroller being programmed for: receiving first commands across said second interface means; extracting, from said commands, a piece of addressing information and, on the basis of said information, executing said first commands or moreover transmitting them over said communication bus; and receiving second commands from said communication bus and executing them. The invention relates to a system comprising: a communication bus; a plurality of electronic boards such as described above, connected to said communication bus, at least one of said boards also being connected to a respective supervisory computer. The invention also relates to a robotic system comprising such a built-in control system.

15 Claims, 2 Drawing Sheets

(56) References Cited

U.S. PATENT DOCUMENTS

Figure 1:
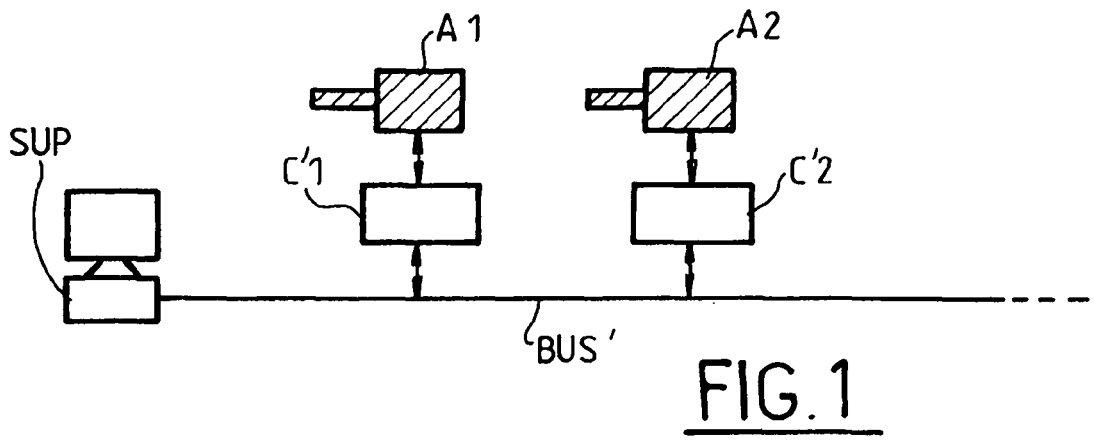

| | | | |
|---|---|---|---|
| 6,003,078 A * | 12/1999 | Kodimer et al. | 709/224 |
| 6,018,787 A * | 1/2000 | Ip | 711/100 |
| 6,473,788 B1 * | 10/2002 | Kim et al. | 709/209 |
| 6,513,058 B2 * | 1/2003 | Brown et al. | 709/201 |
| 6,871,240 B2 * | 3/2005 | Rupp et al. | 710/8 |
| 6,981,221 B2 * | 12/2005 | Neudeck | 715/735 |
| 7,076,322 B2 * | 7/2006 | Chandhoke | 700/181 |
| 7,110,919 B2 * | 9/2006 | Brindac et al. | 702/188 |
| 7,228,390 B2 * | 6/2007 | Rischar et al. | 711/152 |
| 7,454,476 B2 * | 11/2008 | Kim et al. | 709/209 |
| 7,865,251 B2 * | 1/2011 | Law et al. | 700/19 |
| 2004/0133727 A1 * | 7/2004 | Scordalakes | 710/305 |
| 2004/0139263 A1 * | 7/2004 | Krug et al. | 710/305 |
| 2008/0168196 A1 | 7/2008 | Hassbjer et al. | |
| 2013/0094271 A1 * | 4/2013 | Schuetz | 365/63 |

OTHER PUBLICATIONS

International Search Report Issued Nov. 2, 2009 in PCT/FR09/000628 filed May 29, 2009.

* cited by examiner

ELECTRONIC BOARD AND SYSTEM COMPRISING A PLURALITY OF SUCH BOARDS

The invention relates to an electronic card intended in particular for automation, robotics, and industrial data processing. The invention also relates to a system comprising a plurality of such cards interconnected by a communication bus and used for controlling actuators, sensors, and other external devices. Such a system may be used as an on-board control system of a robot.

Until now, industrial needs in terms of automation have been satisfied essentially by conventional devices of the motion controller or servo-controller type.

Motion controllers are typically in the form of extension cards for a personal computer or for an industrial bus. Servo-controllers differ from motion controllers in that they incorporate a power circuit enabling them to be connected directly to an actuator of the electric motor type.

Solutions developed on the basis of such devices are bulky, thereby limiting the possibility of developing on-board systems, e.g. for use in autonomous robots of small dimensions.

Furthermore, the software incorporated in the motion controllers that are available on the market is generally directed to machine tool type industrial applications. As a result, the types of command that can be implemented are limited and are unsuitable for robotic applications.

The few available solutions that are suitable for advanced robotic applications are based on real-time multi-tasking operating systems and they are very expensive.

The development of microcontrollers, incorporating microprocessors dedicated to control applications, random access memories (RAMs), read-only memories (ROMs), communications interfaces, and often analog-to-digital and digital-to-analog converters, is presently bringing about changes in the industrial data processing sector.

For example, the supplier Jeffrey Kerr LLC has developed a control card based on a PIC18F2331 microcontroller and presenting small dimensions and a certain amount of flexibility in use. A document describing that card is available on the Internet at the URL: www.jrkerr.com/picsrvsc.pdf Nevertheless, that card is not suitable for making a modular and decentralized control system, in particular because of its relatively limited communications capabilities.

The invention seeks to overcome at least some of the above-mentioned drawbacks of the prior art. More precisely, it seeks to enable a modular control system to be implemented that is constituted by a plurality of same or similar type cards that are suitable for communicating and co-operating with one another under the supervision of an external computer.

In accordance with the invention, this object is achieved by an electronic card comprising: a microcontroller; first interface means interfacing with a communication bus; and second interface means interfacing with a supervision computer; said microcontroller being programmed:

a) to receive via said second interface means, first commands coming from said supervision computer;

b) to extract addressing information from said commands and, as a function of said addressing information, to execute said first commands or else to forward them over said communication bus via said first means; and c) to receive from said communication bus, via said first interface means, second commands and to execute them.

In advantageous embodiments of the invention:

Said microcontroller may also be programmed:

d) to transmit or to receive, as a function of a configuration setting, a synchronization signal over said communication bus via said interface means; and e) to execute at least some of said first or second commands only on receiving or transmitting said synchronization signal.

The card may also include third interface means enabling said microcontroller to communicate with an external device.

At least some of said first and second commands may comprise setpoints for controlling an actuator connected to the card via said third interface means, execution of said commands including said microcontroller generating a control signal for said actuator.

An interrupt mechanism may be provided to enable said commands including control setpoints to be executed in real time.

Said microcontroller may also be programmed, as a function of a configuration setting:

f) to generate an acknowledgement signal for acknowledging execution of a command including a control setpoint, and to transmit said signal over said communication bus via said first interface means; or g) to receive acknowledgement signals transmitted by other cards over said communication bus.

Said microcontroller may also be programmed:

h) to transmit or to receive via said first interface means a service request directed to or coming from another card;

i) to execute the service request(s) received via said first interface means; and j) to transmit or to receive via said first interface means a response message indicating that a service request has been executed.

Said microcontroller may be programmed to execute the services corresponding to said requests in non-real time.

Said first interface means may be adapted to enable said microcontroller to communicate with other cards of the same type via a bus of the controller-area network (CAN) type.

The second interface means may be of the serial type.

The invention also provides a system comprising: a communication bus; a plurality of electronic cards as described above, connected to said communication bus via respective first interface means; and at least one of said cards also being connected to a respective supervision computer via its second interface means.

In particular, said cards may be mutually identical, both from a hardware point of view and from a software point of view, with the exception of one or more configuration settings.

Advantageously, in such a system, one and only one of said cards is configured to transmit a synchronization signal over said communication bus via its first interface means; and at least one other of said cards is configured to receive said synchronization signal via its first interface means; said cards being programmed to execute at least some of said first and second commands only on receiving or transmitting said synchronization signal.

The invention also provides a robot system including such a control system on board. Advantageously, at least a first electronic card may be connected to an actuator and at least a second electronic card is connected to a sensor.

Figure 2:
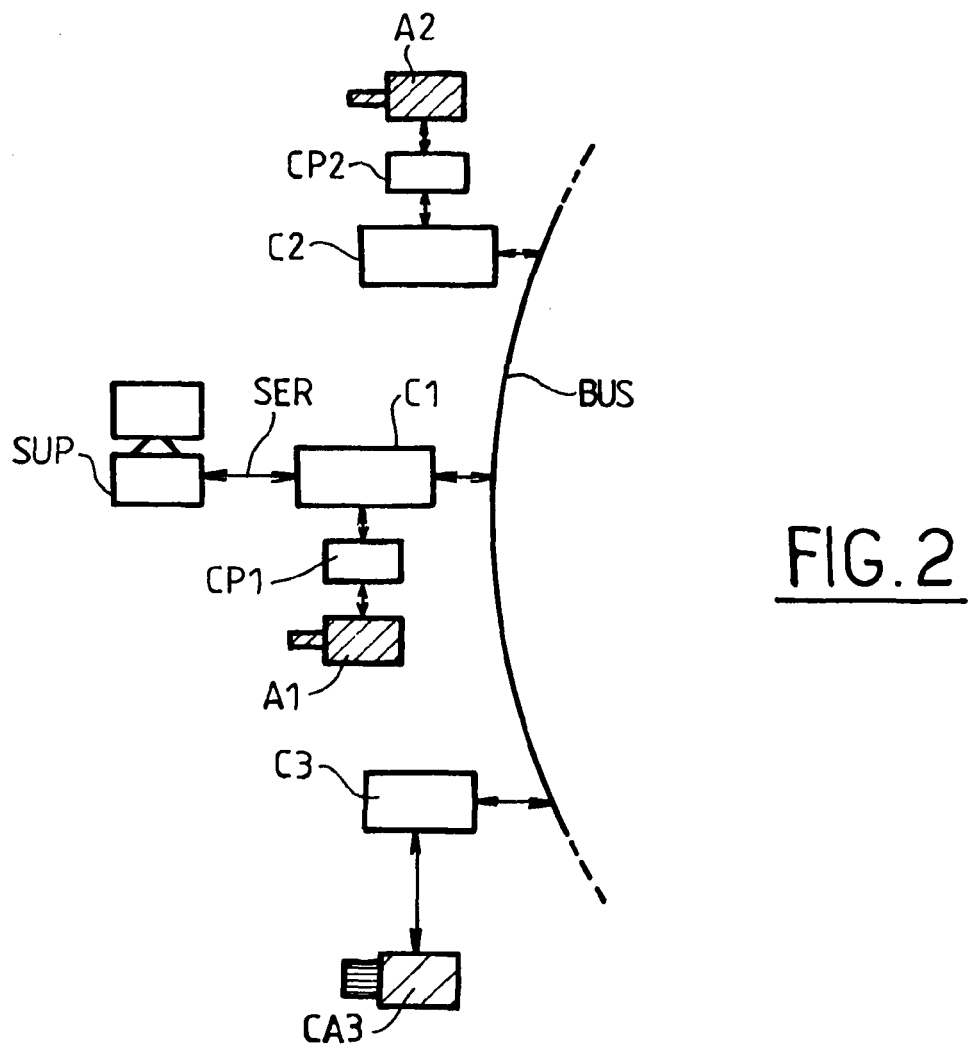

Other characteristics, details, and advantages of the invention appear on reading the following description made with reference to the accompanying drawings given by way of example, which show respectively:

FIG. 1, the architecture of a prior art command system;

FIG. 2, the architecture of a command system of the invention; and

Figure 3:
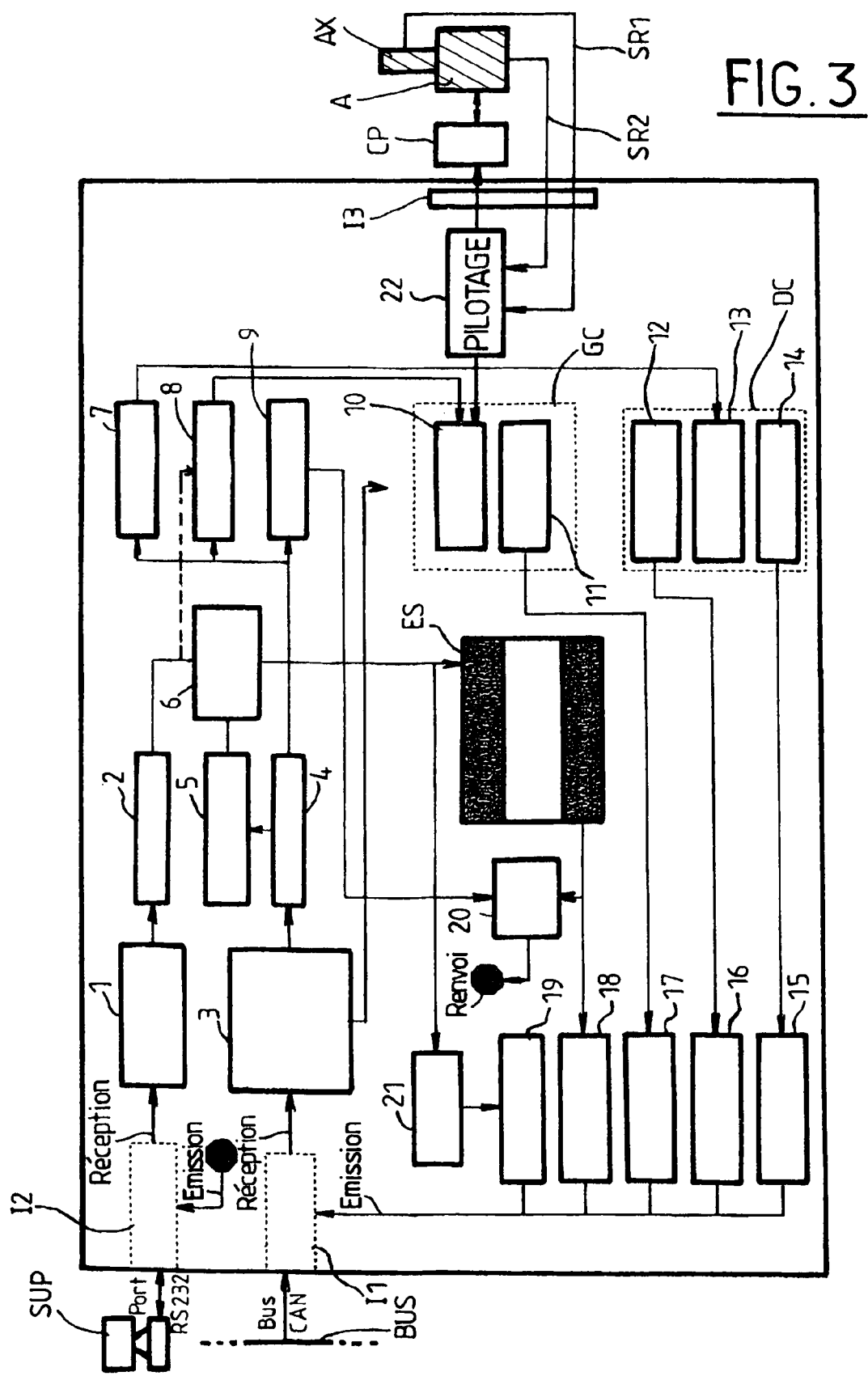

FIG. 3, the functional architecture of an electronic card in an embodiment of the invention.

FIG. 1 shows a command system that is described in greater detail in the above-mentioned document from the supplier Jeffrey Kerr LLC. The system comprises a supervisor SUP and a plurality of command cards C'1, C'2, ..., each controlling an actuator A1, A2 or some other external device. The supervisor and the cards are connected together by a communication bus BUS'. The system operates on the basis of a master-slave type protocol: the supervisor transmits packets of instructions to the command cards; the cards return state information to the supervisor over a separate communications line, and they manage the data collisions that occur on said line. No provision is made for communication between cards, other than on starting in order to allocate a unique address to each card.

FIG. 2 shows the architecture of a command system of the invention. This system is built around a communication bus BUS having connected thereto in bidirectional manner electronic cards C1, C2, C3, etc. The bus BUS may be a fieldbus, e.g. a CAN bus. One of the cards (C1) is also connected to a supervision computer SUP via separate communications means, such as a serial connection. In addition, each card (or sometimes only some of them) is connected to an external device that is controlled. For example, the cards C1 and C2 are connected to respective actuators (respective electric motors A1, A2) via power cards CP1, CP2, while the card C3 is connected directly to a sensor (digital camera CA3). It is preferable for the cards C1, C2 not to incorporate the power circuits CP1, CP2; this makes it possible to limit the size and the cost of the cards and to make them more flexible in use. In a preferred embodiment of the invention, all of the cards of the system are identical, both from a hardware point of view and from a software point of view, with the exception of a certain number of configuration settings.

The supervision computer SUP transmits high level commands to the card C1 over the serial connection SER. By way of example, these high level commands may be operating setpoints for the actuators A1, A2 or requests to send data that are sent to the camera CA3. In addition to controlling one of the actuators of the system, the card C1 also performs a routing role: it decodes the received commands and decides whether or not they are intended for itself. If they are intended for itself, it performs them; for example, it generates a signal for controlling the actuator A1 enabling it to reach the setpoint. Otherwise, it forwards the command (together with corresponding addressing information) over the bus BUS. For example, when the supervisor SUP sends a position setpoint for the actuator A2, the card C1 recognizes that this command is not for itself, and it relays it over the bus; all of the cards in the system read the transmitted command, but only the card C2 recognizes itself as being the destination, and decodes the command and executes it.

The conversion from a setpoint command into a control signal may be performed, for example, by means of a proportional integral derivative (PID) type controller.

After executing (or attempting to execute) the control command, the card issues an acknowledgement message that returns to the supervisor via the card C1. For example, a card may use its acknowledgement message to indicate that it was not possible to execute the command because of a failure; the supervisor may respond by stopping the system or by putting it into a safe position, and by triggering an alarm.

All of the commands forwarded to the cards are not necessarily for controlling the external device: the cards may also perform pure data processing operations (e.g. calculations). In particular, an arbitrary card may request another card to perform a "service": to do this, it sends a request over the bus. The response also returns thereto over the bus.

As a general rule, control commands need to be performed in real time, unlike service requests. In known manner, this is ensured by means of an interrupt mechanism.

In certain applications, a plurality of actuators may be controlled in synchronized manner. This applies for example to a walking robot that needs to actuate a plurality of joints in coordinated manner. For this purpose, a synchronization signal generated by one of the cards of the system (typically but not necessarily the card C1 that is connected to the supervisor) is forwarded over the bus BUS. In this embodiment of the invention, the cards are programmed not to start executing a setpoint instruction until they have received a synchronization signal (or for the synchronization card, on sending said signal).

It is advantageous to observe that in a system it is possible to provide a plurality of supervisors that are connected to different cards (providing care is taken to avoid contradictory instructions being issued or to provide a priority mechanism). In contrast, and in general, only one card can be authorized to issue the synchronization signal.

Advantageously, all of the cards are identical, and in particular they are programmed both to send and to receive synchronization signals. However, a configuration setting may be provided for activating or deactivating the synchronization signal generation function (or reception function, respectively).

It is advantageous to note that the communications protocol implemented is not of the master-slave type: all of the cards are simultaneously masters and slaves.

Preferably, the cards of the system are adapted to interpret high level commands issued by the supervisor, and to convert them into sequences of low level instructions that can be executed directly. This makes it much easier for the user to program the system (where the user accesses only the supervisor).

By way of example, the system of FIG. 2 is applied to an autonomous robot. Under such circumstances:

the serial connection SER may be a wireless link;

some of the cards may control actuators for enabling the robot to move, by means of wheels or legs, or enabling manipulations to be performed by means of arms or other tools;

other cards may control sensors such as cameras or sonars for detecting obstacles;

the supervisor may do no more than issue very high level direction setpoints (e.g.: advance a certain distance in a certain direction at a certain speed) determined on the basis of signals received from the sensors;

the synchronization card may convert these very high level setpoints into lower level setpoints and distribute them amongst the cards associated with the various actuators; and if the computation load is too great, the synchronization card may share said load with the other cards by means of service requests.

The command architecture of FIG. 1 is much more rigid and does not enable this control method to be implemented.

In order to make autonomous robots, it is necessary to control a large number of degrees of freedom by means of on-board cards. These cards therefore need to be of small dimensions and inexpensive. That is why a card of the invention is preferably of a structure that is extremely simple. It is constituted essentially by a microcontroller (e.g. the dsPIC30f4011 microcontroller manufactured by the supplier Microchip), by first interface means interfacing with the communication bus BUS, by second interface means interfacing with the supervision computer SUP, by third interface means enabling said microcontroller to communicate with an external device (actuator, sensor, etc.), and optionally by means providing conventional, "secondary" electronic functions (power supply, diagnosis, protection, . . . ).

The microcontroller executes a program that is stored in an internal or external non-volatile memory, by implementing the functional architecture shown in FIG. 3.

FIG. 3 shows the first interface means I1 connecting the card C to a fieldbus BUS of the CAN type, second interface means I2 connecting it to an RS232 type serial port, and third interface means I3 connecting it to a power card CP for controlling an actuator A. The interface means I1, I2, and I3 comprise both hardware and software.

When an incoming signal is present at the interface I2, an active capture routine (block 1) is triggered, together with an interrupt, where appropriate. The captured signal is then decoded (block 2) to extract therefrom an instruction, or a portion of a complex instruction, which is then passed on to a command assembler-scheduler 6.

Similarly, the presence of an incoming signal at the interface I1 activates a routine for message capture and for interrupt generation (block 3), together with capture of a synchronization signal. The synchronization signal must not be subjected to the same processing as command messages, but should be sent immediately to the setpoint generator GC, that operates as described below. Real time processing of the synchronization signal is made possible by the interrupt routine of block 3.

The instructions received by the first interface means I1 are decoded (block 4) and recognized. They may comprise in particular:
service or operator command messages (5);
setpoint acknowledgement messages (7);
setpoint messages (8); or
general purpose messages (9).

In known manner, service commands are constituted by command codes and by operators. These various elements are received in packets, and not necessarily in order. In addition, different commands may be received simultaneously. This is why it is necessary to have an assembler-scheduler so as to reconstitute complete commands and determine their order of execution.

Reconstituted commands, regardless of whether they are received by the first or the second interface means, are communicated to a server program that executes the required services (generally in non-real time).

The setpoint acknowledgement messages (block 7) that are received by the card having a direct interface with the supervisor are transmitted directly to an acknowledgment-waiting block 13 provided in a setpoint distributor DC that is active in this card only.

The setpoint messages (block 8) received by the card are forwarded directly to a block 10 of a setpoint generator GC where they are stored. This block 10 passes the value of the next setpoint for execution to a control block 22 (e.g. a PID controller) that controls an actuator A via third interface means I3 and optionally via a power circuit CP. In turn, the actuator A drives a shaft AX via a mechanical connection, generally of elastic type. The shaft is controlled in a closed loop: for this purpose, the control block 22 receives as inputs return signals SR1, SR2 indicative of the position and/or the speed of the shaft (SR1), of the control current being consumed by the actuator A (SR2), etc.

It is noteworthy that the card connected directly to the supervisor may itself control a shaft: it thus receives setpoints from the supervisor SUP that are intended directly for itself and that do not need to be delivered over the bus BUS. In FIG. 3, this is represented by the dashed-line connection between the blocks 2 and 8.

General purpose messages 9 are responsive to service requests. By way of example they may contain the results of a calculation. The card that is directly connected to the supervisor receives the general purpose messages generated by the other cards and forwards them to said supervisor via the serial connection, after storing them temporarily in a messaging service 20. The two black octagons represent the functional connection between the messaging service 20 and the RS232 controller (I2) so as to avoid overloading the figure.

The messaging service 20 also receives general purpose messages generated by the server program (block ES) of said card.

In other cards, general purpose messages are transmitted over the bus via the first interface means I1 (see block 18).

The setpoint generator GC, which is active in all of the cards, is essentially a ramp generator that interpolates the position of the actuator between two position setpoint samples that result from calculations for planning a trajectory. The ramp generator may be launched by the synchronization signal (see the functional connection between the blocks 3 and GC). In addition, the setpoint generator GC includes a block 11 for sending and receiving an acknowledgement signal, indicating whether the setpoint has been executed correctly. The acknowledgement messages (block 17) are in turn sent over the bus via the interface means I1.

An interrupt mechanism enables setpoint commands to be executed in real time, by giving them priority over the execution of service requests.

As explained above, the setpoint distributor DC is active only in a card that is connected directly to the supervisor. This component performs several functions:
via the bus and the interface I1, it distributes to the other cards the setpoints that it receives from the supervisor and that are for those cards (blocks 12 and 17);
it waits for the setpoint acknowledgement signals that reach it, likewise over the bus and the interface I1, from said other cards; in the event of an expected acknowledgement not being received, it informs the supervisor and causes the setpoint generators of all of the other cards to be stopped (via the CAN bus); and
it generates (block 14) the synchronization signal and transmits it (block 15) over the bus.

Concerning this synchronization signal function, it is appropriate to emphasize that it is not necessarily associated with dispensing setpoints. It is possible to envisage that the synchronization card is not the same card as the card that receives setpoints from the supervisor and that distributes them to the remainder of the system.

Finally, a "client" program 21 receives as inputs commands coming from the assembler-scheduler and generates service requests that are transmitted to the other cards via the bus and the interface I1 (see block 19).

The functional diagram of FIG. 3 is quite general and is suitable for a variety of applications. The card may be delivered together with a predetermined instruction set for some specific application. For example, these instructions may comprise controlling the actuator and the sensor, time delays, functions concerning the management of error situations, input and output commands, and mathematical operations.

Other instructions may be added as required. An "instruction" is no more than a mnemonic code that triggers a routine stored in a non-volatile memory (internal or external to the microcontroller). Several actuator control algorithms may also be provided.

This produces a system that is simultaneously modular, flexible, and easily personalized.

The invention claimed is:

1. An electronic card comprising:
   a microcontroller;
   a first interface interfacing with a communication bus; and
   a second interface interfacing with a supervision computer;
   said microcontroller being programmed:
   a) to receive via said second interface, first commands coming from said supervision computer;
   b) to extract addressing information from said first commands and, as a function of said addressing information, to execute said first commands or else to forward them over said communication bus via said first interface; and
   c) to receive from said communication bus, via said first interface, second commands and to execute them.

2. The electronic card according to claim 1, wherein said microcontroller is also programmed:
   d) to transmit or to receive, as a function of a configuration setting, a synchronization signal over said communication bus via said first interface; and
   e) to execute at least some of said first or second commands only on receiving or transmitting said synchronization signal.

3. The electronic card according to either preceding claim, also including a third interface enabling said microcontroller to communicate with an external device.

4. The electronic card according to claim 3, wherein at least some of said first and second commands comprise setpoints for controlling an actuator connected to the card via said third interface, execution of said commands including said microcontroller generating a control signal for said actuator.

5. The electronic card according to claim 4, wherein an interrupt mechanism is provided to enable at least some of said first or second commands including control setpoints to be executed in real time.

6. The electronic card according to claim 4, wherein said microcontroller is also programmed, as a function of a configuration setting:
   f) to generate an acknowledgement signal for acknowledging execution of a command including a control setpoint, and to transmit said signal over said communication bus via said first interface; or
   g) to receive acknowledgement signals transmitted by other cards over said communication bus.

7. The electronic card according to claim 1, wherein said microcontroller is also programmed:
   h) to transmit or to receive via said first interface a service request directed to or coming from another card;
   i) to execute the service request(s) received via said first interface; and
   j) to transmit or to receive via said first interface a response message indicating that a service request has been executed.

8. The electronic card according to claim 7, wherein said microcontroller is programmed to execute the services corresponding to said requests in non-real time.

9. The electronic card according to claim 1, wherein the first interface is adapted to enable said microcontroller to communicate with other cards of the same type via a bus of the CAN type.

10. The electronic card according to claim 1, wherein the second interface is of the serial type.

11. A system comprising:
    a communication bus;
    a plurality of electronic cards according to claim 1, connected to said communication bus via respective first interfaces; and
    at least one of said cards also being connected to a respective supervision computer via its second interface.

12. The system according to claim 11, wherein said cards are mutually identical, both from a hardware point of view and from a software point of view, with the exception of one or more configuration settings.

13. The system according to claim 11 or claim 12, wherein one and only one of said cards is configured to transmit a synchronization signal over said communication bus via its first interface; and at least one other of said cards is configured to receive said synchronization signal via its first interface; said cards being programmed to execute at least some of said first and second commands only on receiving or transmitting said synchronization signal.

14. A robot system including an on-board control system comprising the system according to claim 11.

15. The robot system according to claim 14, wherein at least a first electronic card is connected to an actuator and at least a second electronic card is connected to a sensor.

* * * * *

UNITED STATES PATENT AND TRADEMARK OFFICE
CERTIFICATE OF CORRECTION

| | | |
|---|---|---|
| PATENT NO. | : 8,572,291 B2 | Page 1 of 1 |
| APPLICATION NO. | : 12/996265 | |
| DATED | : October 29, 2013 | |
| INVENTOR(S) | : Jean-Pierre Gazeau et al. | |

It is certified that error appears in the above-identified patent and that said Letters Patent is hereby corrected as shown below:

On the title page, Item (73), the Assignee's Information is incorrect. Item (73) should read:

--(73)   Assignee:   Universite de Poitiers, Poitiers (FR)--

Signed and Sealed this
Eleventh Day of March, 2014

Michelle K. Lee
*Deputy Director of the United States Patent and Trademark Office*